United States Patent [19]
Cloke et al.

[11] Patent Number: 6,111,717
[45] Date of Patent: Aug. 29, 2000

[54] DISK DRIVE COMPRISING A PROGRAMMABLE PREAMPLIFIER INCLUDING A MULTIPLEXER FOR SELECTING BETWEEN INTERNAL DIGITAL SIGNALS FOR OUTPUT TO A TERMINAL

[75] Inventors: Robert L. Cloke, Santa Clara; David Price Turner, Los Gatos, both of Calif.; Robert Ellis Caddy, Jr., Oronoco, Minn.; Michael Rodger Spaur, Laguna Niguel, Calif.

[73] Assignee: Western Digital Corporation, Irvine, Calif.

[21] Appl. No.: 09/036,375

[22] Filed: Mar. 6, 1998

Related U.S. Application Data

[62] Division of application No. 08/577,606, Dec. 22, 1995, Pat. No. 5,726,821.

[51] Int. Cl.[7] ............................................. G11B 5/02
[52] U.S. Cl. ............................. 360/67; 360/25; 360/46
[58] Field of Search ............................ 360/46, 65, 67, 360/68, 53, 60, 61, 66; 330/86

[56] References Cited

U.S. PATENT DOCUMENTS

| | | |
|---|---|---|
| 5,357,379 | 10/1994 | Gower .................................. 360/46 |
| 5,430,584 | 7/1995 | Petersen ............................ 360/46 X |
| 5,488,518 | 1/1996 | Shier .................................. 360/46 X |

*Primary Examiner*—Paul Loomis
*Assistant Examiner*—K. Wong
*Attorney, Agent, or Firm*—Milad G. Shara

[57] ABSTRACT

A disk drive comprising a plurality of read/write transducers, a programmable preamplifier, and a controller for furnishing control and data signals to the programmable preamplifier and for receiving data signals therefrom, is disclosed. The programmable preamplifier comprising a write data input circuit for receiving data signals to be supplied to a transducer, a read data output circuit for manifesting data signals supplied to said preamplifier unit by a transducer, and a transducer interface circuit for providing write data signals to a transducer and receiving read data signals from a transducer. The programmable preamplifier further comprises a multiplexer comprising a first multiplexer input connected to receive a first internal digital signal, a second multiplexer input connected to receive a second internal digital signal, a control input connected to receive a control signal for selecting between the first and second internal digital signals, and a multiplexer output for outputting the selected first or second internal digital signal. The multiplexer output is connected to an output terminal of the programmable preamplifier. The programmable preamplifier comprises a serial interface circuit for receiving serially presented control signals from the associated controller, including the control signal for selecting between the first and second internal digital signals.

16 Claims, 4 Drawing Sheets

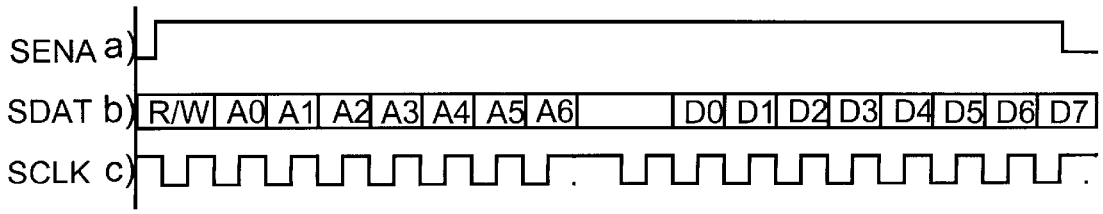
FIG. 3
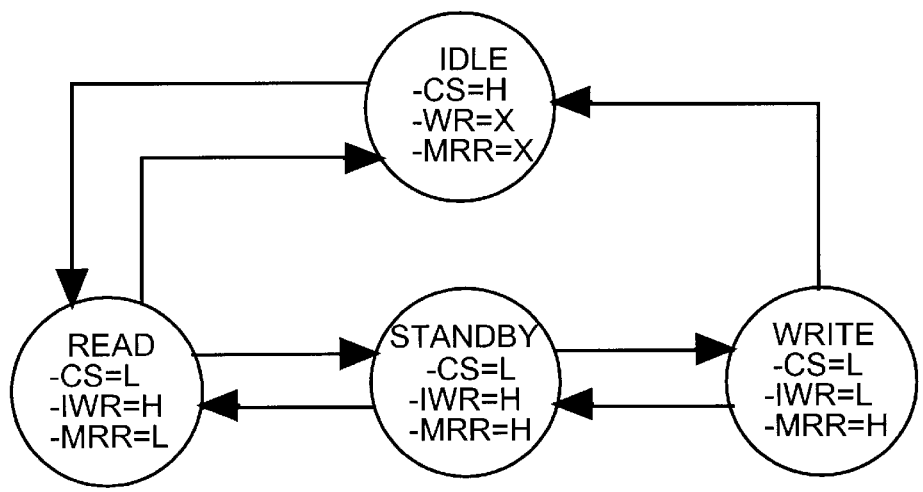
FIG. 4
| -CS | -IWR | -MRR | MODE (RDX/RDY CONTROL) |
|---|---|---|---|
| HIGH | X | X | IDLE (RDX/RDY OFF) |
| LOW | HIGH | HIGH | STANDBY (RDX/RDY OFF) |
| LOW | LOW | HIGH | WRITE (RDX/RDY OFF) |
| LOW | HIGH | LOW | READ (RDX/RDY ON) |
| LOW | LOW | LOW | WRITE, MR READ TEST MODE (RDX/RDY ON) |
FIG. 5

DISK DRIVE COMPRISING A PROGRAMMABLE PREAMPLIFIER INCLUDING A MULTIPLEXER FOR SELECTING BETWEEN INTERNAL DIGITAL SIGNALS FOR OUTPUT TO A TERMINAL

This application is a Division of application Ser. No. 08/577,606, filed on Dec. 22, 1995, now U.S. Pat. No. 5,726,821.

BACKGROUND OF THE INVENTION

1. Field of the Invention

This invention relates to preamplifiers used in rotating disk storage devices. In particular, this invention relates to preamplifiers incorporated into the head disk assembly in close proximity to the read/write heads associated to the data storage disks.

2. Description of the Related Art

Rotating disk data storage devices are known in which one or more read/write heads, typically inductive heads, are used to store data on and read data from an associated disk media surface. In a typical magnetic media implementation of such a storage device, a circuit element known as a "preamplifier" or "preamplifier/write driver", receives from an associated "channel" device both data signals to be written onto a disk surface during a write operation, and control signals used to specify the individual head to be selected for a read or write operation. The preamplifier/write driver also typically supplies analog data signals read from a head to the associated channel. A typical preamplifier/write driver includes a write preamplifier for conditioning the write data signals received from the associated channel, a read preamplifier for amplifying signals supplied by a read head, a multiplexer for interconnecting the data input and data output internal lines to one of a plurality of read/write heads, and a mode control unit for operating the multiplexer in response to control signals supplied from the channel, typically a chip select signal (-CS) for controlling the state of the circuitry within the preamplifier, and a read/write (R/W) signal for specifying either a read operation or a write operation.

As the complexity of disk data storage devices has increased by adding heads (and corresponding additional storage surfaces), the requirement for added functions and controls has also increased. The use of magnetoresistive (MR) read/write heads has introduced the need for further control circuitry providing the required bias current or voltage to the read portion of such heads. Additionally, MR heads double the head selection problem, having separate read and write head connections versus the use of inductive heads where a common head is used for reading and writing. Still further, the highly competitive disk drive market requires cost reduction through automating testing of drives during manufacture and in the field. Because a drive may be manufactured with a variety of head configurations supplied from multiple sources, and in fact a preamplifier/write driver circuit may be multiply sourced, an increasing sophistication in structure and function in the preamplifier/write driver design is now required to improve efficency, yield and consequently, cost in the manufacture of the drive.

The demand for additional function in the preamplifier/write driver must be satisfied within the constraints of a limited number of integrated circuit terminal pins since both cost and available circuit board space are design constraints. There is, therefore a need for a preamplifier/write driver which satisfies the demand for increasing test functions in a complex manufacturing environment while meeting the conflicting demands of cost and board space reduction.

SUMMARY OF THE INVENTION

In a first aspect, the invention provides a programmable preamplifier/write driver (also known in the art as a "preamplifier") for use with a disk drive assembly having a plurality of heads including magnetoresistive read heads. The invention provides for the use of a serial port to program circuits within the preamplifier including the setting of write current or MR head bias voltage or current. The invention further provides for the use of the serial port to select from a plurality of heads for reading or writing. The invention yet further provides for the measurement of a variety of operating parameters through the use of circuits programmed through the serial port. The invention provides for the incorporation of an Analog to Digital conversion (ADC) circuit within the preamplifier including a Digital to Analog converter (DAC) and comparator. The DAC provides dual functionality through a switch located at its output, allowing the same DAC to be used for both the setting of write current and for inclusion in a successive approximation ADC circuit.

From an apparatus standpoint, the invention includes a disk drive assembly having a controller, a head disk assembly with a plurality of transducers, at least some of which include MR transducers, and a preamplifier/write driver unit having a write data input circuit for receiving data signals from the controller to be supplied to a transducer, a read data output circuit for manifesting data signals supplied to the preamplifier/write driver unit by one of the plurality of transducers, a transducer interface circuit for providing write data signals to the plurality of transducers and receiving read data signals from the plurality of transducers, and a write only serial interface circuit for receiving serially presented control signals from the controller for controlling the operation of at least some of the read data output circuit, the transducer interface circuit and special test circuitry incorporated within the preamplifier/write driver unit. A write current generator is included to provide write current to a selected transducer, the transducer being selected in response to head select control signals supplied from the controller and stored in the serial interface unit. The write current generator is also used to supply current to a test comparator used during a test mode to determine the magnitude of current flowing through a selected MR transducer. During this test mode, proper bias is supplied to the selected MR transducer in response to an MR bias control character furnished from the controller to the serial interface unit. An additional test circuit is incorporated into the preamplifier/write driver which enables remote polling of the preamplifier/write driver unit by the controller using serially successively presented multi-bit pattern characters which are compared with preestablished individual bit lines specifying certain parametric information, such as head type or configuration or integrated circuit type or vendor information. The output from each of the test circuits is coupled via a multiplexer to a single test output terminal, and the transfer path through the multiplexer is controlled by a mode control character supplied from the controller to the serial interface unit. The preamplifier/write driver is provided with a serial interface coupled to the associated channel and requires only three serial interface conductors for providing a wide variety of remotely controlled testing, control and status functions, including head selection, write current control, power down, gain control, MR head bias measurement, head population measurement and parameter information polling functions.

The invention is highly configurable and readily adaptable to a variety of head disk assembly configurations using either conventional inductive or MR heads.

From a method standpoint, the invention includes a method of controlling the operation of a preamplifier/write driver unit in a disk drive having a plurality of read/write transducers and a controller for furnishing control and data signals to the preamplifier/write driver unit and for receiving data signals therefrom, the preamplifier/write driver unit including a write data input circuit for receiving data signals to be supplied to a transducer, a read data output circuit for manifesting a data signals supplied to the preamplifier/write driver unit by a transducer, and a transducer interface circuit for providing write data signals to a transducer and receiving read data signals from a transducer, the method including the steps of supplying serially presented control signals from the associated controller to the preamplifier/write driver unit, storing the serially presented control signals in at least one storage resister in the preamplifier/write driver unit, and using the serially presented control signals to control the operation of the write data input circuit, the read data output circuit, the transducer interface circuit and additional test circuits incorporated into the preamplifier/write driver unit. The method includes the technique of providing both write current and test current from a common current source in the preamplifier/write driver unit, including the steps of generating a initial current level, generating a mode control signal having two different states, applying the initial current level to a transducer path in response to one of the mode control signal states, and applying the initial current level to a test path in response to the other one of the mode control signal states. The initial current level is preferably externally specified by a initial current level character generated by the disk drive controller and transferred to the serial interface unit in the preamplifier/write driver unit. Similarly, the state of the mode control signal is specified by an externally supplied mode control character.

From a different method aspect, the invention provides a method of determining the magnitude of current flowing through an MR transducer in a disk drive apparatus having a controller and a preamplifier/write driver unit, the method including the steps of applying a known bias to the MR transducer, generating a succession of reference current specifying serial bit characters, successively transferring each of the reference current specifying characters from the controller to the preamplifier/write driver unit, generating a reference current corresponding to each reference current character, comparing the reference current with actual current flowing through the MR transducer, generating a signal indicating the relative magnitudes of the reference current with respect to the actual current, and repeating the process until the magnitude of the actual current is determined. It should be noted that although current measurement is used in the preferred embodiment specified herein, a voltage measurement technique could be used with equivalent results. In a disk drive apparatus having a plurality of MR transducers, the method includes the step of selecting an individual MR transducer prior to applying the known bias, the selection being preferably performed by generating a head select serial bit character in the controller and transferring the character from the controller to the preamplifier/write driver unit. A variation of this method, used to determine the presence or absence of an MR transducer, proceeds by selecting the MR transducer to be tested (in a multiple transducer installation), generating a minimum reference current, applying bias to the selected MR transducer, comparing the minimum reference current with the actual current flowing through the selected MR transducer, generating a signal representative of the relative magnitude of the minimum reference current with respect to the actual current, and transferring this signal to the controller for further system processing. This method can be expanded by applying a write current to the MR transducer specified by the head select character, sensing the actual write current flowing through the MR transducer, and generating a signal indicating the relative magnitude of the actual current with respect to a minimum threshold current value. If an MR transducer is not connected to the transducer path to which the method is applied, the actual current will be less than the minimum reference current, signifying either an open head or no transducer. The write current embellishment to the method verifies the initial test results.

From a slightly different method aspect, the invention includes a method of polling a preamplifier/write driver unit in a disk drive apparatus having a controller, a preamplifier/write driver, and a plurality of transducers to remotely determine preestablished parametric values. This aspect of the method includes the steps of transferring a succession of serial bit characters each representative of a different pattern from the controller to the preamplifier/write driver unit, successively comparing in the preamplifier/write driver unit each serial bit pattern character with a plurality of individual bit lines representative of at least one parametric value, generating a match signal in the preamplifier/write driver unit when a serial bit pattern character matches the plurality of individual bit lines, and transferring the match signal from the preamplifier/write driver unit to the controller.

For a fuller understanding of the nature and advantages of the invention, reference should be had to the ensuing detailed description taken in conjunction with the accompanying drawings.

BRIEF DESCRIPTION OF THE DRAWING

FIG. 3 is a timing diagram illustrating a data transfer from the storage system controller to a serial interface unit;

FIG. 4 is a state transition diagram for the preferred embodiment; and

FIG. 5 is a control signal/mode table for the preferred embodiment.

DETAILED DESCRIPTION OF THE PREFERRED EMBODIMENTS

For the following description of this invention reference is made to the Glossary at the end hereof for definitions of terms used herein.

Figure 1:
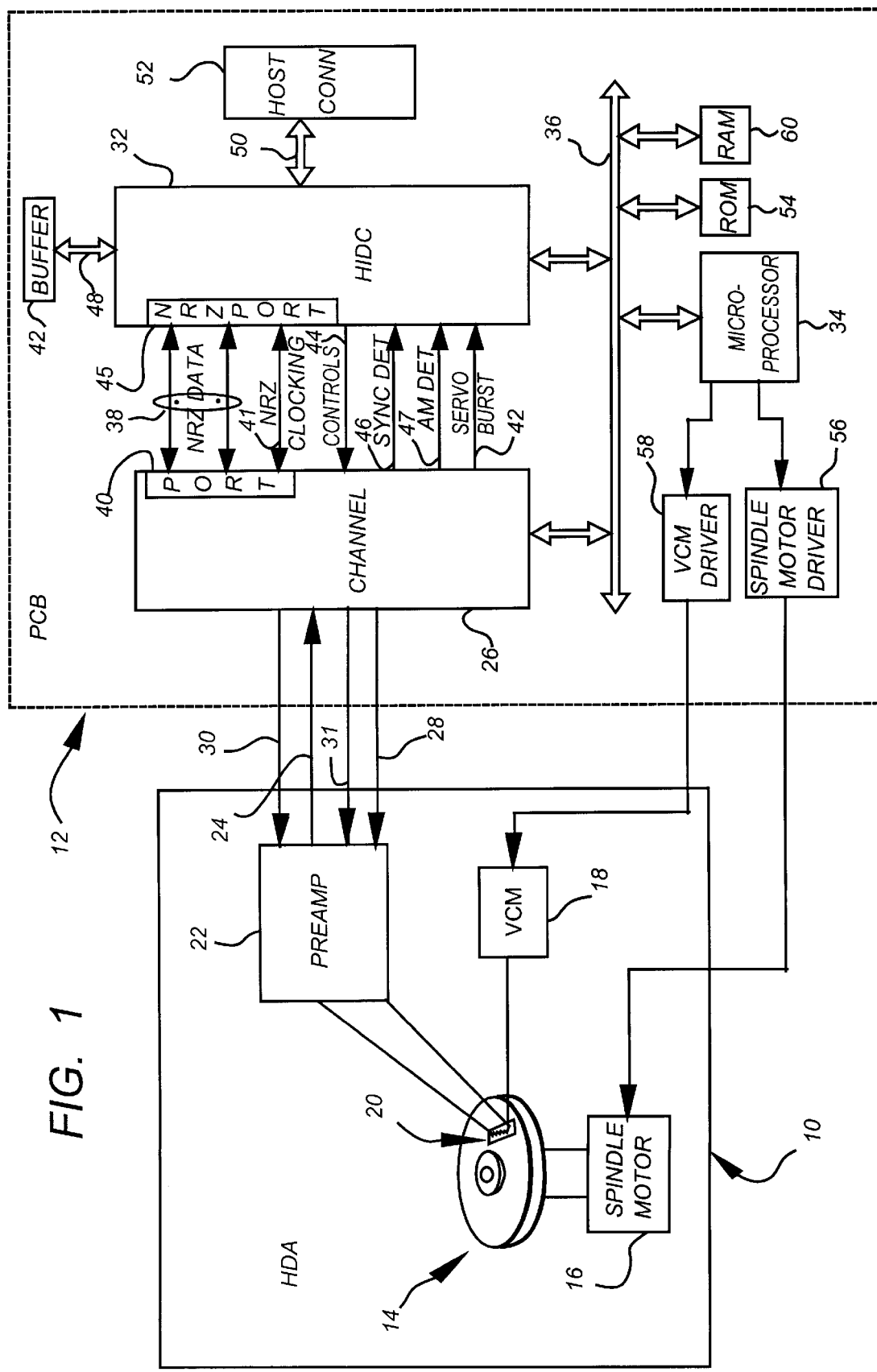
FIG. 1 is a block diagram of a rotating magnetic disk data storage system incorporating the invention.

Referring to FIG. 1, a rotating magnetic disk data storage device ("disk drive") in accordance with a preferred embodiment of this invention is illustrated in a block schematic drawing. As shown in FIG. 1, the disk drive includes a head disk assembly (HDA) 10 which includes the is electromechanical components of the disk drive and a printed circuit board (PCB) 12 which contains the disk drive control circuitry in a plurality of integrated circuits (ICs). The HDA 10 and PCB 12 are shown schematically for ease of illustration in FIG. 1 and will be described in more detail below with respect to a preferred physical layout.

More specifically, HDA 10 includes rotatable data storage disks 14 (only two of which are illustrated for convenience in FIG. 1) on which the data is stored in a plurality of tracks. The tracks include embedded servo information which is interspersed with the data. The disks 14 are rotated by a spindle motor 16. HDA 10 also includes an actuator assembly including an actuator motor 18, in a preferred embodiment being a voice coil motor, which moves read/write transducers 20 to the tracks at different radial positions on disk 14. Transducers 20 are magnetoresistive transducers which employ write current to an inductive portion of the head when writing data to a disk and bias current or voltage to a resistive portion of the head when reading data from a disk. HDA 10 also includes preamplifier/write driver 22 described in detail below. In general, preamplifier/write driver 22 includes an initial preamplifier for amplifying analog read signals provided by a particular head 20 selected for reading. Preamplifier/write driver 22 provides the preamplified analog read signals along a pair of lines 24 to the PCB 12. During write operations preamplifier/write driver 22 receives analog write signals along a pair of lines 28 from PCB 12 and provides a write current to the particular head 20 selected for writing. Three mode select signals provided to preamplifier/write driver 22 along lines 30 determine whether the preamplifier/write driver 22 a operates in a read mode or a write mode. In addition, preamplifier/write driver 22 includes serial interface logic, storage and control circuitry described more fully below for effecting programmable test and control functions in accordance with control, clock and data signals provided by channel 26 along three lines collectively designated with reference numeral 31.

The following description, still referring to FIG. 1, is not critical to the invention but is provided as background material. The disk drive control circuitry provided on PCB 12 includes channel 26, host interface and disk controller (HIDC) 32, microprocessor 34, buffer 44, microprocessor Read Only Memory (ROM) 54, Random Access Memory (RAM) 60, spindle motor driver 56 and voice coil motor driver 58. Channel 26 provides the circuitry for conditioning the analog signals provided along line 24 from preamplifier/write driver 22, detecting and decoding servo and user data from the analog read signals, and demodulating analog servo bursts also provided along line 24. Channel 26 provides such detected and decoded servo and user data and demodulated servo bursts to HIDC 32. Channel 26 also communicates with the disk drive microprocessor 34 via local microprocessor bus 36. During write operations, the channel 26 receives data to be written to the disk 14 from the HIDC 32, encodes the data in accordance with RLL code constraints, converts the encoded data to analog form and amplifies the analog data signals before providing them along line 28 to preamplifier/write driver 22. In addition, channel 26 provides control, clock and data signals to preamplifier/write driver 22 along lines 31 and receives data from preamplifier/write driver 22 along one of the three lines 31.

Channel 26 preferably provides servo and user data to, and receives user data from, HIDC 32 via a high speed direct connection 38. This high speed connection 38 allows data to be communicated between channel 26 and HIDC 32 without waiting for access to the microprocessor bus 36 thereby allowing high speed data transfer in read/write operations. To further speed the transfer of data along connection 38, the connection 38 may preferably be several bits wide; for example, an 8 bit wide connection 38 provides a presently acceptable data transfer rate. Fewer bit lines may be employed, however; for example a nibble (four bit) wide connection may be employed, depending upon the data transfer requirements for the specific implementation. This is illustrated schematically by the plural bit lines in FIG. 1 Alternatively, a single bit serial connection 38 may be employed.

The data transferred along connection 38 may preferably be in NRZ form in the case of a sampled data detection channel 26. The data may also be transmitted in a NRZI form; for example, in the case of a peak detection channel 26. Also, the data connection 38 preferably provides both servo data and user data along the same interface lines during read operations. This multiplexing of the data connection 38 between servo data and user data is indicated generally by a single port 40 for the data connection 38 to the channel 26. A separate clock line 41 is also provided, which transfers servo clock and user clock signals in a time multiplexed fashion between channel 26 and HIDC 32.

As further illustrated in FIG. 1, the channel 26 provides the demodulated analog servo bursts to HIDC 32 along dedicated line 42. Although the servo control circuitry is preferably incorporated in HIDC 32, which may be a single IC to reduce space on the PCB 12, alternatively such servo burst control may be provided in a separate dedicated servo control IC. As also shown in FIG. 1, the dedicated communication lines between channel 26 and HIDC 32 further preferably include a control line 44 for providing control signals from HIDC 32 to channel 26 and SYNC line 46 and Address Mark (AM) line 47 for providing indication of SYNC mark detection and AM detection, respectively, to HIDC 32.

As further illustrated in FIG. 1, the disk drive control circuitry includes a high speed buffer 44. Buffer 44 stores data read from the disk surface, including user data and servo data, under the control of HIDC 32 as well as data provided from the host prior to writing to the disk surface. Buffer 44 may preferably be a random access memory such as a dynamic random access memory (DRAM) or static random access memory (SRAM). Buffer 44 is preferably large enough to hold multiple sectors of data for both read and write operations and in a presently preferred embodiment may hold 64–256K (bytes) of data or more. As illustrated, buffer 44 is coupled to HIDC 32 via HIDC bus 4. Microprocessor 34 may also have access to buffer 44, under the control of HIDC 32 which acts as a buffer manager to arbitrate access to buffer 44 For example, buffer 44 may temporarily store host commands which are read by microprocessor 34 for performing disk drive functions.

In addition to providing arbitrated access to the buffer 44, the HIDC 32 interfaces with the host along host interface bus 50 and host interface connection 52. The host may preferably be a computer system having a standardized input/output (I/O) bus and standardized interface connection adapted to couple to connection 52. In PC host computer systems, the I/O bus may typically take the form of the AT bus which has become a de facto standard for IBM PC compatible computer systems and is referred to as the Industry Standard Architecture (ISA). A higher speed Enhanced ISA bus has also been introduced. Various attachments to the AT bus have also become common for allowing peripherals, including data storage devices, to more efficiently couple to the AT bus. For example, the Integrated Drive Electronics (IDE) attachment to the ISA bus has become a very common interface for attaching disk drives to the standardized ISA bus. Similarly, an Enhanced IDE interface is used to couple disk drives to host busses such as the PCI bus. Such attachments are typically incorporated into host computer systems. The disk drive may be coupled directly to the I/O bus, or via an attachment to the I/O bus, via a cable or other connector that is suitable for the specific computer and application. In a presently preferred embodiment this invention may be adapted to attach to the host I/O bus via an IDE or Enhanced IDE interface (I/F) and connector cable. In this case, connection 52 may be a standard 40 pin IDE connector.

It should be appreciated, however, that other interfaces may also be employed, and such alternate interfaces include the Small Computer System Interface (SCSI), the Serial SCSI Architecture (SSA) interface, the P1394 interface, the Fibre Channel interface, and the parallel printer port interface. Accordingly, the following description of this invention, may be applied with any of the above-noted alternate interfaces, or other suitable interfaces, with the host.

To allow communication with the host along host interface bus 50, HIDC 32 preferably includes a set of IDE host interface task file registers which may be implemented in a conventional manner so as to be read by microprocessor 34 as well by HIDC 32. HIDC 32 will also conventionally include a set of host command registers and host data registers for the parallel transfer of commands and data along bus 50.

In addition to the host interface functions and buffer management functions described above, HIDC 32 also preferably controls the disk formatting and the translation of the host's logical address for data to be written or read from the disk surfaces, to actual physical information (i.e. cylinder (or track)/head/sector) for access to the proper location on the disk surface(s). This conversion from logical to physical address may include defect management. Also, HIDC 32 may include conversion of data to and from NRZI format (in the case of a peak detection channel). Furthermore, HIDC 32 preferably includes ECC (error correction code) detection and correction circuitry to allow correction of data read from the disks and stored in buffer 44.

Microprocessor 34 may be a commercially available microprocessor or microcontroller. For example, a Model No. 80C196NP2 microprocessor available from intel Corporation may be employed. Microprocessor 34 controls several disk drive functions under microprogram control. For example, in a preferred embodiment, these functions include reading and decoding of host commands, spindle motor 16 start up and speed control via spindle driver circuitry 56, control of positioning of the actuator 18 via voice coil motor driver 58, control of reduced power modes of operation, as well as other functions which may be conventional in nature. As further shown in FIG. 1, the microprocessor 34 is coupled to ROM 54 via microprocessor bus 36. ROM 54 includes prestored control microprograms for microprocessor 34 to allow microprocessor 34 to monitor and control the basic disk drive functions noted above.

As further illustrated in FIG. 1, the microprocessor 34 may also be coupled to RAM 60. For example, to reduce the amount of control program code prewritten into ROM 54, control programs not required for the initial start up of the disk drive may be prerecorded onto the disk surface and read, after initial start up, and loaded into RAM 60 to control further 10 microprocessor 34 functions. Depending upon the amount of such memory required, and the capacity of buffer memory 44, RAM 60 may optionally be dispensed with and the required storage provided by buffer 44.

Figure 2:
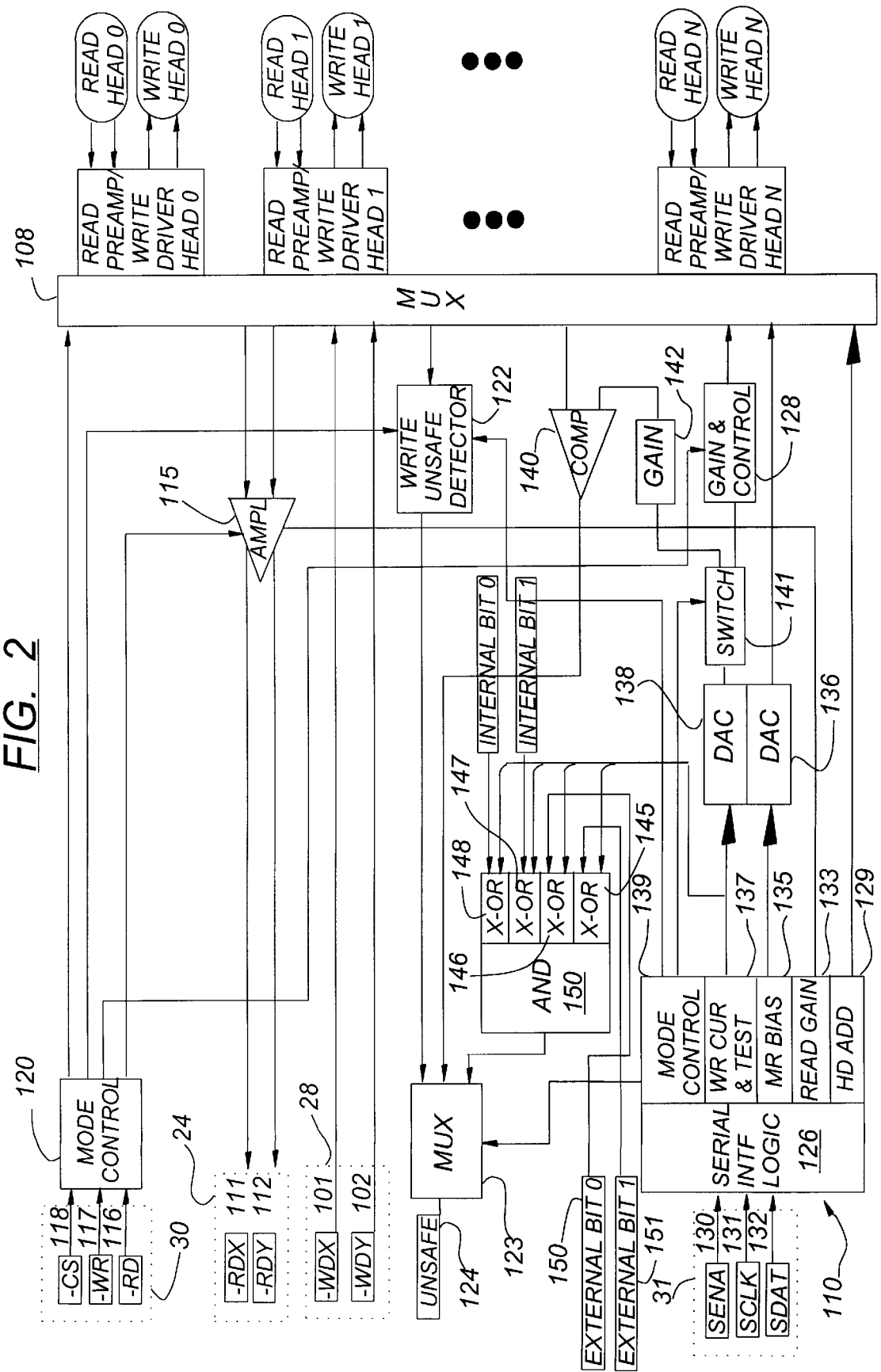
FIG. 2 is a block diagram of a preferred embodiment of the invention.

FIG. 2 illustrates a block diagram of the preferred embodiment of preamplifier/write driver 22. As seen in this figure, preamplifier/write driver 22 includes a pair of write data input terminals 101, 102 for receiving complementary serial data signals to be written to an appropriate location on one of the disks 14 by means of one of the heads 20. The write data input terminals 101, 102 are coupled to a multiplexer 108 in which the signals are routed to a write head driver selected from a plurality (six in the preferred embodiment) of such drivers designated Write Driver, Head 0; Write Driver, Head 1, Write Driver, Head N. The particular write driver to be selected is designated in the embodiment shown by four bits of digital information generated by a serial interface unit 110, described in detail below. It should be noted that other embodiments using more or less bits of digital information can be applied as well.

Preamplifier/write driver 22 also includes a pair of read data terminals 111, 112 for furnishing complementary read data signals read by an MR read head from a selected location on an associated one of disks 14 and coupled via multiplexer 108 through a differential variable gain amplifier 115 to read output terminals 111, 112.

Preamplifier/write driver 22 is further provided with three control input terminals 116–118 which receive mode select control signals for specifying a read operation (-MRR), a write operation (-IWR), each operation involving the disk heads 20; and a chip select signal (-CS) which is used in the manner described below to activate a stand-by mode. Control signal input terminals 116–118 are coupled to separate inputs of a mode control unit 120 used to control the operational state of several elements incorporated into preamplifier/write driver 22. One such element is the variable gain amplifier 115, the gain level of which can be programmably varied among four different states by serial interface unit 110. Another unit controlled by mode select unit 120 is a write unsafe detector 122, which is normally used to generate a write unsafe signal whenever one or more of several conditions described below occurs. The output of write unsafe detector is coupled to one transfer input of a multiplexer 123, which has an output coupled to a write unsafe output terminal 124. Mode control unit 120 also controls the operational state of a write current gain and control unit 128 which supplies write current via multiplexer 108 to a selected write transducer specified by a head address register portion 129 of serial interface unit 110.

Preamplifier/write driver 22 is also provided with three input terminals 130, 131, 132, each of which is coupled to a different input of serial interface unit 110 in order to provide a serial interface enable control signal, a serial interface clock signal, and serial data to appropriate logic circuitry within interface unit 110.

As already noted, the head address register portion 129 of serial interface unit 110 is coupled to multiplexer 108 and is used in the head select process during a write data operation to a disk 14 and a read data operation from a disk 14, as well as certain test and measurement operations described below. Another register portion 133 designated the Read Gain register portion of serial interface unit 110 is coupled to the gain control input of variable gain amplifier 115 and is used to select the amount of signal gain provided by amplifier 115 to the data signals read from a selected head and supplied to amplifier 115 via multiplexer 108. In the preferred embodiment, the gain select control signals from Read Gain register portion 133 includes two data bits which provide four different levels of gain selection. Another register portion 135 of serial interface unit 110 designated the MR Bias register portion is coupled to a digital to analog converter 136 and is used to specify the amount of bias voltage to be supplied to a selected MR read head selected for a read operation by the head address register portion 129. Still another register portion 137 of the serial interface unit 110 designated the Write Current and Test register portion is coupled to another digital to analog converter 138 and is used in two different modes of operation to specify the amount of current to be supplied either to a head selected for a write operation by Head Address register portion 129 or to a comparator 140 used in the MR resistance test mode described below. In the first alternate mode of operation, the Write Current and Test portion 137 supplies a four-bit control code to digital to analog converter 138, and the corresponding analog output signal from converter 138 is routed by a switch 141 to the write current gain and control unit 128. In the second mode of operation, the output of converter 138 is routed via switch 141 to a gain circuit 142 in which the magnitude of the analog output signal from converter 138 is scaled to an appropriate range for the test measurement described below.

The Write Current and Test register portion 137 of serial interface unit 110 is also coupled to a plurality of logic gates 145–148. More specifically, each bit of the four-bit control signal is coupled to a first input of a different one of the gates 145–148, which in the preferred embodiment are exclusive OR gates. The remaining inputs to gates 145, 146 are supplied from a pair of external terminals 150, 151 which are set to one of two different reference levels (i.e., VCC or ground) during assembly. These two bits serve to identify the type of configuration of heads 20 installed in HDA 10. The two remaining inputs to gates 147, 148 are internally programmed data bits which are fixed during the integrated circuit manufacturing process by which preamplifier/write driver 22 is fabricated. These two bits serve to specify the manufacturer or type of the integrated circuit comprising a given preamplifier/write driver 22. The individual outputs of the gates 145–148 are coupled to a four-input AND gate 150, the output of which is coupled to one input of multiplexer 123.

Serial interface unit 110 has another register portion 139 designated the Mode Control portion which is used to control the operation of write unsafe detector 122, multiplexer 123 and switch 141 in the manner described more fully below.

Serial interface unit 110 is implemented in the preferred embodiment by using three eight-bit registers arranged to provide the Head Address resister portion 129, Read Gain register portion 133, MR bias register portion 135, Write Current and Test register portion 137 and Mode Control register portion 139. The Head Address register portion 129 utilizes three bits to select one out of a maximum of eight combined read/write heads, and MR bias portion 135 uses four bits to provide sixteen different levels of bias voltage for the magnetoresistive read heads. Register portions 129 and 135 are preferably combined in a single register. Write Current and Test register portion 137 uses four bits to specify sixteen different levels of write current and bias current comparison levels for the MR bias current test described below. Mode Control register portion 139 employs two bits to specify a maximum of four different modes of operation. In the preferred embodiment, only three such modes are used: MR bias current measurement, vendor code information measurement, and normal write current mode for a data write operation. These seven bits are preferably organized in a single register. The Read Gain register portion 133 uses two bits to provide four different gain levels for amplifier 115. These two bits are located in a third register.

The table below lists the register address and bit numbers for register portions 129, 133, 135, 137 and 139. As seen in this table, bits 0–2 of register 7FX provide the three head select address bits, while bits 3–6 of register address 7FX specify the magnitude of the MR bias. Bits 0–3 of register address 7EX provide the write current, MR bias test current and vendor code test values. Bits 4 and 5 of register address 7EX specify the significance of the tour bits (bits 0–3) in register address 7EX.

| Register | Bits | Description |
| --- | --- | --- |
| '7F'X | 0–2 | Head select address |
| '7F'X | 3–6 | MR bias set |
| '7E'X | 0–3 | Write current est, MR bias current trial, vendor code measure trial |
| '7E'X | 4 | Set MR bias measure mode |
| '7E'X | 5 | Set vendor code measure mode |

The table below sets forth the specific two-bit codes defining the significance to be accorded bits 0–3 of register 7EX: viz., whether they specify the magnitude of the write current to be applied to a selected write head, whether the MR bias current measurement test is to be conducted, and whether the vendor code information test is to be applied. These two bits form part of the mode control register portion 139.

| Bit 4 | Bit 5 | Definition of bits 0–3 |
| --- | --- | --- |
| 0 | 0 | Write current set bits |
| 1 | 0 | Trial setting for MR bias current measurement |
| 0 | 1 | Trial setting for measuring vector code information |

Bits 0–1 are metal mask chip vendor code
Bits 2–3 are HC0, HC1 I/O respectively

Serial interface unit 110 includes an interface logic portion 126 incorporating the necessary elements to receive the serially presented control data on terminal 132, to use the timing signals presented on terminal 131 to effect a properly timed data transfer into the internal registers within serial interface unit 110 and to sense the state of the enable signal on terminal 130. In the preferred embodiment, serial interface unit 110 is a write only data port (i.e., a unidirectional data port) which is provided with the capacity to update the contents of each internal register in response to appropriate control and data signals on input terminals 130–132. New data supplied to a given register is written over old data.

FIG. 3 illustrates a complete data transfer. Each data transfer includes sixteen bits of data: eight address bits followed by eight data bits. Data and addresses are loaded least significant bit first. Whenever the enable signal SENA is asserted, a data transfer is initiated. The data signals in the SDAT signal train are clocked into the internal shift register in logic circuit portion 126 by the rising edge of the SCLK signal. A counter located in logic portion 126 prevents more than sixteen bits from being clocked into the shift register. If less than sixteen clock pulses occur before the SENA is deasserted, the counter aborts the transfer. When the SENA signal is deasserted, the eight bits of data clocked into the internal shift register in portion 126 are loaded into the internal register specified by the eight address bits.

Figure 6:
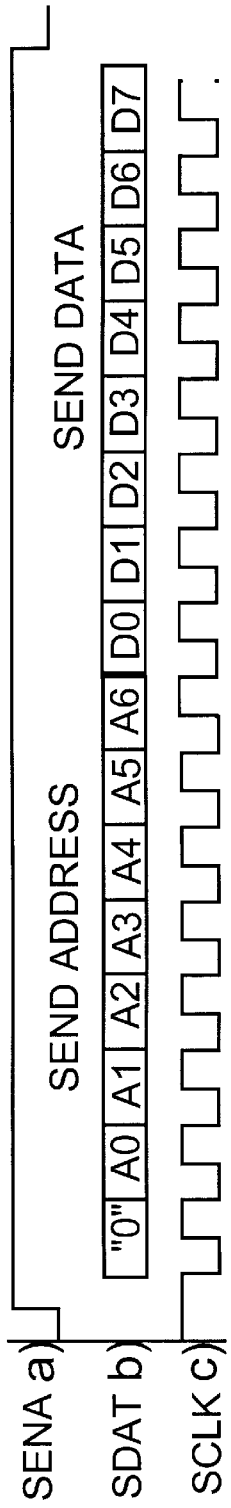
FIG. 6 is a timing diagram illustrating a write operation using a bi-directional implementation of the serial interface.
Figure 7:
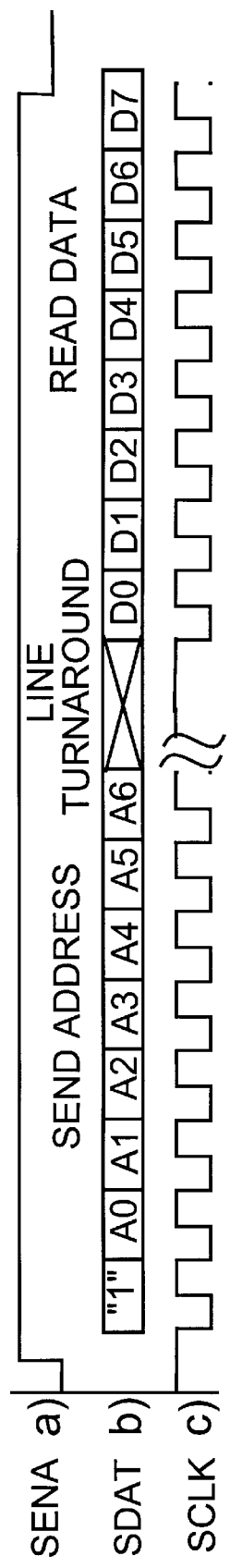
FIG. 7 is a timing diagram illustrating a read operation using a bi-directional implementation of the serial interface.

Although the preferred embodiment includes a unidirectional serial interface, an alternate embodiment provides a bi-directional implementation of the serial interface allowing register and state values to be communicated back to the channel with the same three lines. FIG. 6 illustrates a write sequence using the bi-directional protocol. The polarity of the first bit transmitted in this sequence indicates that a write operation is dictated. FIG. 7 illustrates the corresponding read operation wherein the first bit exhibits opposite polarity from the write sequence.

With reference to FIGS. 4 and 5, preamplifier/write driver 22 has four basic modes of operation illustrated by the state transition diagram (FIG. 4) and the control signal/mode table (FIG. 5). These four modes of operation are IDLE, STANDBY, READ and WRITE.

In the IDLE mode, -CS is deasserted, and all state variables for the preamplifier/write driver are not maintained. Register portions 129, 133, 135, 137 and 139 may be updated by a serial WRITE transfer into serial interface unit 110 in the manner described above. No bias current is supplied to the magnetoresistive read heads in HDA 10. Similarly, no read data signals are present at terminals 111, 112.

In the STANDBY mode, -CS is asserted: -IWR and -MRR are deasserted. No bias current is supplied to the magnetoresistive heads. All state variables are maintained to provide relatively rapid transition to the READ and WRITE modes. As shown in the FIG. 4 state diagram, the STANDBY mode is entered from either the READ or the WRITE mode. In the preferred embodiment, the STANDBY mode has a maximum duration of 500 $\mu$s before returning to the READ mode. In addition, transitions from the RED to the STANDBY mode or from the STANDBY to the READ modes take less than 0.5 $\mu$s. Should preamplifier/write driver 22 somehow be permitted to remain in the STANDBY mode for longer than 500 $\mu$s, a recovery procedure similar to that required in a transition from the IDLE mode to the READ mode is necessary Register portions 129, 133, 135, 137 and 139 of serial interface unit 110 may be updated. Note that transitions from a READ mode to a WRITE mode and the reverse always involve the STANDBY mode. During such transitions, preamplifier/write driver 22 is in the STANDBY mode for a brief period (typically less than 100 nanoseconds).

During the READ mode, -CS and -MRR are asserted, and -IWR is deasserted. MR bias is applied to the magnetoresistive head selected by register portion 129 of serial interface unit 110. The magnitude of the bias current is set by the value in register portion 135. READ mode is entered from either the STANDBY mode or the WRITE mode. The various register values in serial interface unit 110 may not be altered in the READ mode.

In the WRITE mode, -CS and -IWR are asserted, and -MRR is deasserted. No bias current is applied to any magnetoresistive head. The WRITE mode can be entered from the READ mode or the STANDBY mode, and preamplifier/write driver 22 returns to the READ mode or the STANDBY mode from the WRITE mode.

In the STANDBY mode, preamplifier/write driver 22 can be operated in several different test modes. In a first test mode, a magnetoresistive head is selected by means of a head selection address supplied to register portion 129 of serial interface unit 110 and an MR bias voltage of predetermined value is applied to the selected magnetoresistive head by digital to analog converter 136 and multiplexer 108, the value of the bias voltage being determined by a value in register portion 135 of serial interface unit 110. The current flowing through the head is coupled via multiplexer 108 to a first input of comparator 140. The second input to comparator 140 is a series of current values supplied via digital to analog converter 138 and switch 141 in response to successive known test values supplied serially to register portion 137 of serial interface unit 110. The output of comparator 140 is coupled via multiplexer 123 to output terminal 124 under control of mode control register portion 139 of serial interface unit 110. The binary signal on terminal 124 is coupled via control and data lines 24 (FIG. 1) and channel 26 to HIDC 32 for analysis in accordance with the following measuring procedure.

The resistance value of the selected magnetoresistive head is remotely measured by the HIDC 32 by successive comparisons of the current flowing through the selected head with different values of current supplied to comparator 140 in response to the four bit current values supplied from HIDC 32 to register portion 137 of serial interface unit 110. The voltage level applied to the selected head is a known constant value set by HIDC 32, consequently, the resistance can be determined by dividing the fixed voltage value by the value of the current flowing through the selected head. In the preferred embodiment, if the level of the comparator 140 output value (and thus the value of the bilevel signal present on terminal 124) is at a high level, the bias current flowing through the selected head is greater than the reference current supplied to comparator 140 from digital to analog converter 138 and switch 141. Conversely, if the level at the output of comparator 140 is at a low level, then the current flowing through the select head is less than the reference value. By selecting current reference values using a successive approximation technique, the magnitude of the bias current flowing through the selected head can be determined to a desired degree of accuracy with a relatively small number of measurement cycles. For example, in the preferred embodiment the is permitted range of currents through a magnetoresistive head lies in the range from 5 to 20 mA. Using a four-bit reference current selection character, sixteen levels of reference current may be remotely specified, so that the resolution of the measurement is accurate to 1 mA. Also, a maximum of four successive approximations are sufficient to measure the value of the bias current flowing through the selected head to the desired resolution of 1 mA.

The above bias current measurement procedure can also be used to sense the absence of a head from HDA 10. More particularly, with the bias voltage applied via register portion 135, converter 136 and multiplexer 108 to a selected head, a minimum current value may be set into register portion 137, and the resulting reference current may be compared in comparator 140 with the current flowing through the selected head. If the measured current is less than the predetermined minimum threshold value, the head resistance is beyond the maximum value, which indicates either an open read head or the absence of a read head in the selected head position. The result of this test can be verified by subsequently attempting a write operation to the same head position, operating multiplexer 123 to transfer the output of the write unsafe detector 122 to output terminal 124 and observing the level of the signal on terminal 124. If this signal achieves the write unsafe warning level during the attempted write operation, the absence of a head at the selected head position specified by the value in head address register portion 129 is confirmed.

A second test mode of operation for preamplifier/write driver 22 is used to examine other information of interest. In particular, Mode Control register portion 139 conditions multiplexer 123 to couple the output of AND gate 150 to terminal 124. Thereafter, successive four-bit values are supplied from HIDC 32 to register portion 137 of serial interface unit in a serial fashion, and these values are successively applied to the reference inputs of exclusive OR gates 148. When the four-bit code from register portion 137 matches the data inputs to gates 145–148, the output of AND gate 150 specifies the match by changing state. A look-up table accessible to HIDC 32 identifies the specific matching configuration. For example, the two bits input to gates 145, 146 can specify one of four intended head configurations; while the input signals to gates 147, 148 can specify the manufacturer or type of the actual integrated circuit comprising preamplifier/write driver 22. Alternatively, the four data bits applied to gates 145–148 may be used to specify other parameters of interest, as desired.

As will now be apparent, preamplifier/write drivers fabricated according to the teachings of the invention afford a number of advantages over known preamplifier/write drivers for head disk assemblies. Firstly, all of the specific parameter setting and test functions are under firmware control from HIDC 32: consequently, no hardware changes are required in order to change the specific parameters. For example, the gain values applied to variable gain amplifier 115 supplied from read gain register portion 133, the write current magnitude supplied by write current and test register portion 137, the magnitude of the MR bias voltage supplied or specified by MR bias register portion 135, and the head select addresses supplied by head address register portion 129 can all be varied in any desired manner by firmware changes. In addition, digital to analog converter 138 performs the dual function of providing write current for the associated write heads and also the test current used in the MR bias resistance measurement test involving comparator 140. This dual use of digital to analog converter 138 saves both space and power in any integrated circuit in which preamplifier/write driver 22 is incorporated by fabrication. In this connection, the dual use of digital to analog converter 138 is simplified by selecting appropriate permitted ranges of current values for the write current and the MR resistance test measurement current. For example, in the preferred embodiment the permitted write current range is chosen to be from 12.5 mA to 50 mA, while the MR bias current range is selected to be from 5 mA to 20 mA. Since each range has a ratio of 4 to 1, the write current values can be simply converted to the MR test current values by scaling the write current down by a factor of 2.5. Thus, 12.5 mA of write test current is converted to 5 mA of MR bias test current by means of fixed gain unit 142; similarly, write current or 50 mA is converted to MR test current of 20 mA by scaling the write current by the same factor. If desired, a variable gain unit 142 may be employed, and additional control bits supplied from an expanded register portion of serial interface unit 110 in order to provide programmable gain factors for unit 142.

An additional advantage of the invention dies in the shared use of the write current and test register portion 137 information to specify not only the magnitude of the write current and the MR test current, but also the test configuration patterns for the parameter information compared in gates 145–148. A still further advantage of the invention lies in the shared use of terminal 124 to provide write unsafe status signals, the MR current comparison signals from comparator 140, and the parameter information comparison signals from AND gate 150.

In general, the invention affords a relatively simple and inexpensive technique for not only providing the customary read and write functions found in known preamplifier/write driver units, but also retrieving information from the head stack of HDA 10 which is pertinent to various drive test or initialization operations, such as the value of the resistance of each MR head in a stack, the number of heads actually populated on the drive, the vendor or type number for the preamplifier/write driver 22, and the vendor or configuration of the heads on the drive. This information is extremely useful during factory test procedures, and also in field test procedures. Most importantly, the nature of the information retrieved, the magnitudes of the several parameters (MR bias, write current, MR test current, and amplifier 115 gain magnitude) can all be changed using firmware techniques in order to tailor the parameters and tests to evolving designs.

While the above provides a full and complete disclosure of the preferred embodiments of the invention, various modifications, alternate constructions and equivalents may be employed. For example, while serial interface unit 110 has been described with reference to a write only unit, if desired a bidirectional unit having both a write capability and a read capability may be employed, as desired. In addition, while the fixed parameter multi-bit test characters are shared with the write current and MR test current characters in register portion 137, additional register space may be provided, as desired. To supply independent muiti-bit test characters for testing these fixed parameters Therefore, the above description and illustrations should not be construed as limiting the scope of the invention which is defined by the appended claims.

GLOSSARY

The following definitions of terminology employed in this application are generally believed to be consistent with the usage in the art. However to the extent such definitions are inconsistent with such usage, the following should govern herein. Also, to the extent the foregoing descriptions of the preferred embodiment of this invention may be susceptible to a different or narrower interpretation for the following terms, the below definitions should govern for the following claims.

actuator—the electromechanical component or assembly which moves the read/write head(s) from track to track on the magnetic disks.

bit frequency (or channel frequency)—the inverse of the channel bit period; (1/T)

channel bit period (T)—also called code bit period—the basic channel time period which corresponds to the time which the read/write transducer head is over a storage cell.

data read channel—electrical signal path from the read transducer head to an output decoded binary data signal and clock signal.

data sector—portion of a track having fixed number of bytes of user data written therein; currently typically 512 bytes or 1024 bytes.

data zone—set of radial tracks having the same channel frequency for user data read therefrom.

disk drive—a rotating magnetic disk data storage device or a rotating optical disk data storage device.

head disk assembly (HDA)—the components of the disk drive located within the disk drive housing, including the housing itself.

NRZ Non-Return to Zero)—A system of encoding, binary data which does not provide means for clock derivation and where a binary 1 and a binary 0 are each represented by a different voltage level which remains constant throughout a bit cell period.

NRZI (Non-Return to Zero Inverted)—the coding system where a binary 1 is represented by a transition from a 1st level or state to a second level or state and where a binary 0 is represented by the absence of a transition.

Read/Write Head—the magnetic transducer(s) which read and write data to and from the magnetic disks—the read and write heads need not be of the same type; for example, a read head which is magneto-resistive in operation may be combined with a write head which is inductive in operation.

RLL (Run Length Limited) coding—a form of coding which restricts the minimum and maximum number of binary zeros between binary ones.

servo bursts—analog track centering information recorded in the servo field.

servo data—data recorded in a servo field including track ID information.

servo zone—set of radial tracks having the same channel frequency for servo data read therefrom.

spindle motor—the motor which rotates the magnetic disks, typically at a fixed angular velocity.

storage cell—the portion of a track having the smallest magnetization pattern.

track—a linear magnetic recording region on the disk surface which extends in a arc through an angular range of 360 degrees; each track may be a separate annular region or may be a 360 degree portion of a single spiral extending from the inner portion of the magnetic disk surface to the outer diameter.

write channel—the electrical signal path from a binary data signal provided within the disk drive to the analog signal provided to the write transducer head.

We claim:

1. A programmable preamplifier unit for use in a rotating disk drive apparatus having a plurality of read/write transducers and a controller for furnishing control and data signals to the preamplifier unit and for receiving data signals therefrom, said preamplifier unit comprising:
    a write data input circuit for receiving data signals to be supplied to a transducer;
    a read data output circuit for manifesting data signals supplied to said preamplifier unit by a transducer;
    a transducer interface circuit for providing write data signals to a transducer and receiving read data signals from a transducer;
    a multiplexer comprising:
        a first multiplexer input connected to receive a first internal digital signal;
        a second multiplexer input connected to receive a second internal digital signal;
        a control input connected to receive a control signal for selecting between the first and second internal digital signals; and
        a multiplexer output for outputting the selected first or second internal digital signal;
    an output terminal connected to the multiplexer output; and
    a serial interface circuit for receiving serially presented control signals from the associated controller, including the control signal for selecting between the first and second internal digital signals.

2. The invention of claim 1 further comprising in said preamplifier unit a write unsafe detector circuit coupled to said transducer interface circuit for generating a write unsafe signal, wherein the first internal digital signal is the write unsafe signal.

3. The invention of claim 2 further comprising in said preamplifier unit a test reference signal generator circuit for generating a test signal, and a comparator circuit comprising:
    a first signal input coupled to said test reference signal generator and a second signal input coupled to said transducer interface circuit; and
    an output for outputting the first internal digital signal.

4. The invention of claim 3 further comprising:
    means in said serial interface circuit coupled to said test reference signal generator circuit for specifying the magnitude of said test signal.

5. The invention of claim 4 further comprising:
    in said test reference signal generator circuit,
        means for generating a reference value lying within a first magnitude range in response to said serial interface circuit, and
        scaling means having an input coupled to said reference value generating means and an output coupled to said first input of said comparator circuit for scaling said reference value to a different magnitude range.

6. The invention of claim 1 further comprising in said preamplifier unit a parameter information circuit incorporating predetermined identifying information and having an output for generating the first internal digital signal.

7. The invention of claim 6 further comprising:
    in said parameter information circuit,
        a plurality of gates each having first and second inputs, and
        means coupled to said first gate inputs for providing parameter data signals; and
        means in said serial interface circuit coupled to said second gate inputs for coupling remotely generated pattern data signals to said second gate inputs whereby a match between said parameter data signals and said pattern data signals results in a match signal generated at the output of the parameter information circuit representing the first internal digital signal.

8. The invention of claim 2 further comprising:
    in said write unsafe detector circuit, a control input coupled to said serial interface circuit; and
    in said serial interface circuit, means for generating a control signal for controlling the operational state of said write unsafe detector circuit.

9. A disk drive comprising:
    a plurality of read/write transducers;
    a programmable preamplifier comprising:
        a write data input circuit for receiving data signals to be supplied to a transducer;
        a read data output circuit for manifesting data signals supplied to said programmable preamplifier by a transducer;
        a transducer interface circuit for providing write data signals to a transducer and receiving read data signals from a transducer;
        a multiplexer comprising:
            a first multiplexer input connected to receive a first internal digital signal;
            a second multiplexer input connected to receive a second internal digital signal;
            a control input connected to receive a control signal for selecting between the first and second internal digital signals; and
            a multiplexer output for outputting the selected first or second internal digital signal;

an output terminal connected to the multiplexer output; and a serial interface circuit for receiving serially presented control signals; and a controller for furnishing control and data signals to the programmable preamplifier, including the control signal for selecting between the first and second internal digital signals, and for receiving data signals from the programmable preamplifier.

10. The disk drive as recited in claim 9, further comprising in said programmable preamplifier a write unsafe detector circuit coupled to said transducer interface circuit for generating a write unsafe signal, wherein the first internal digital signal is the write unsafe signal.

11. The disk drive as recited in claim 9, further comprising in said programmable preamplifier a test reference signal generator circuit for generating a test signal, and a comparator circuit comprising:

a first signal input coupled to said test reference signal generator and a second signal input coupled to said transducer interface circuit; and an output for outputting the first internal digital signal.

12. The disk drive as recited in claim 11, further comprising means in said serial interface circuit coupled to said test reference signal generator circuit for specifying the magnitude of said test signal.

13. The disk drive as recited in claim 12, further comprising in said test reference signal generator circuit:

means for generating a reference value lying within a first magnitude range in response to said serial interface circuit; and scaling means having an input coupled to said reference value generating means and an output coupled to said first input of said comparator circuit for scaling said reference value to a different magnitude range.

14. The disk drive as recited in claim 9, further comprising in said programmable preamplifier a parameter information circuit incorporating predetermined identifying information and having an output for generating the first internal digital signal.

15. The disk drive as recited in claim 14 further comprising:

in said parameter information circuit, a plurality of gates each having first and second inputs, and means coupled to said first gate inputs for providing parameter data signals; and means in said serial interface circuit coupled to said second gate inputs for coupling remotely generated pattern data signals to said second gate inputs whereby a match between said parameter data signals and said pattern data signals results in a match signal generated at the output of the parameter information circuit representing the first internal digital signal.

16. The disk drive as recited in claim 10, further comprising:

in said write unsafe detector circuit, a control input coupled to said serial interface circuit; and in said serial interface circuit, means for generating a control signal for controlling the operational state of said write unsafe detector circuit.

* * * * *